Patented Mar. 28, 1950

2,502,151

UNITED STATES PATENT OFFICE 2,502,151

DIMETHYLAMINOALKYLAMINO ANTI-HISTIMINIC COMPOUNDS

Raymond Jacques Horclois, Malakoff, France, assignor to Societe des Usines Chimiques Rhone-Poulenc, Paris, France, a French company No Drawing. Application May 15, 1946, Serial No. 670,043. In France June 22, 1943

Section 1, Public Law 690, August 8, 1946
Patent expires June 22, 1963

13 Claims. (Cl. 260—256.4)

The present invention relates to new chemical compounds and to processes of producing the same. More particularly, this invention is concerned with new substituted diamines.

It is the main object of the present invention to provide new tertiary diamines having exceptionally powerful anti-histaminic action. It is a further object of this invention to provide processes for the production of these new diamines.

These new compounds may be described as alkylene diamines which are substituted on the one amino nitrogen atom by two methyl groups and are substituted on the other amino nitrogen atom by respectively a monocyclic heterocyclic nucleus and a group —CH₂R where R is a radical selected from the class consisting of alkyl, aralkyl, aryl and monocyclic heterocyclic groups and aryl and aralkyl groups substituted in the aryl nucleus by a member of the class consisting of alkyl and alkoxy groups. In general, these compounds conform to the general formula:

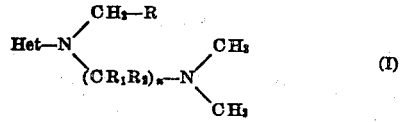

in which "Het" represents a monocyclic, heterocyclic nucleus (e. g. pyridine, piperidine, furane, tetrahydrofurane, thiazole and pyrimidine); R represents a radical as hereinbefore defined; R₁ and R₂ represent a member of the class consisting of hydrogen atoms and alkyl groups, and $n$ a whole number not less than 2.

The new compounds of the present invention may be prepared by the following processes:

(a) Condensing a secondary amine of the type:

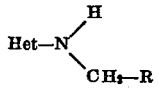

with a tertiary amine containing a reactive group X of the formula:

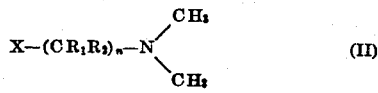

in which X may be a halogen atom, a hydroxyl group or a sulphuric or sulphonic acid ester radical.

(b) Condensation of a heterocyclic amine of which the nitrogen atom is directly attached to the nucleus and substituted on the nitrogen by a dimethylaminoalkyl group, either with a member of the class of alkyl and aralkyl halides, or an alkyl heterocyclic derivative substituted by a halogen atom in the alkyl chain, or with alcohols corresponding to these halogenated derivatives, or with sulphuric or sulphonic esters of such alcohols.

(c) Condensation of a heterocyclic halogenated derivative with a secondary-tertiary diamine of general formula:

$$R-CH_2-NH-(CR_1R_2)_nN(CH_3)_2$$

in which R, R₁ and R₂ and $n$ have the significance hereinbefore expressed.

Other methods of preparation useful in certain cases, particularly in those in which the starting materials necessary for methods (a), (b) and (c) are for some reason or another difficultly accessible, consist in:

(d) Condensation of dimethylamine with a monocyclic, heterocyclic amine of general formula:

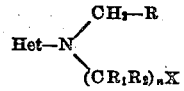

in which the symbols have the significance hereinbefore defined. In the case where X represents a hydroxyl group, it is advantageous to effect the reaction in the presence of zinc chloride; if X represents a halogen atom, it is preferred to employ an excess of the secondary amine or of a tertiary base such as pyridine.

(e) Conversion of a primary-tertiary mono-heterocyclic diamine of the general formula:

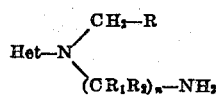

into di-tertiary diamines of general formula I by classical methods of methylation such as the action of halogenated methyl halides, sulphuric esters, methyl sulphuric esters or methyl sulphonic esters, or of formaldehyde in presence of reducing agents, or of diazomethane. The initial primary-tertiary diamines are readily accessible, for example they may be prepared by condensation of a monosubstituted monocyclic heterocyclic amine of the type:

$$Het-NH-CH_2-R$$

with a nitrile X(CR₁R₂)ₙ₋₁CN and reduction to:

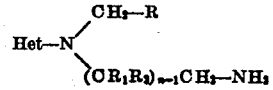

or again by Hoffman or Curtius degradation of the amides or the azides of an acid:

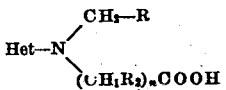

which yields

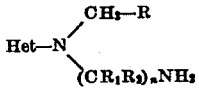

(f) Condensation of an aldehyde R—CHO with a secondary base of general formula Het—NH—$(CR_1R_2)_n N(CH_3)_2$ in the presence of a reducing agent such as formic acid. Alternatively, a secondary base: Het—NH—$CH_2R$ may be condensed with an aldehyde:

$$OHC—(CR_1R_2)_{n-1}N(CH_3)_2$$

(g) Condensation of dimethylamine in the presence of a reducing agent with an aldehyde (or its acetals) derived from a monocyclic, heterocyclic amine which has the following general formula:

to form the tertiary diamines:

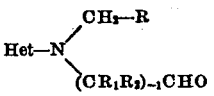

The initial aldehyde or its acetal is obtained by condensation of a substituted monocyclic, heterocyclic amine with a halogenated acetal $X(CR_1R_2)_{n-1}CH(OC_2H_5)_2$.

(h) Reduction of an amide of the general formula:

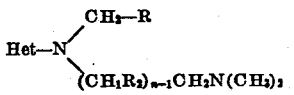

or

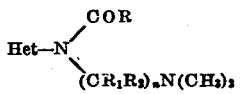

by known methods. The amides can be obtained by the action of an acid chloride R—COCl on a dimethylamino-alkyl-heterocyclic amine or of the acid chlorides: $(CH_3)_2N—(CR_1R_2)_{n-1}COCl$ on the substituted monocyclic, heterocyclic amine: Het—NH—$CH_2$—R.

The present invention is illustrated by the following non-limitative examples:

Example I 46 g. of α-benzylaminopyridine in 50 ccs. of dry toluene are heated to 80° C. (the α-benzylaminopyridine may be obtained either according to the method of Tchitchibabine and Knunjanz, Berichte, 64, 2839 (1931), which consists in warming α-aminopyridine with benzaldehyde in formic acid, or alternatively by the action of benzyl chloride on sodio-α-aminopyridine). To the toluene solution there are added gradually 9.5 g. of 85% sodamide. After evolution of ammonia, the major part of the toluene is distilled off; into the pasty mass which remains there are poured 120 ccs. of an ethereal solution of 27 g. of dimethylaminochloroethane. The mixture is heated until the temperature reaches 140° C., the ether distilling out, then finally heated under reduced pressure (150 mm. Hg) for half-an-hour.

The mass is taken up with dilute hydrochloric acid and ether, neutralised at pH 7, and α-benzylaminopyridine separates. After making alkaline, using excess of potash, it is extracted with benzene, dried and distilled. The product thereby obtained, dimethylamino-ethyl - N - benzyl-N-α-aminopyridine, boils at 185–190°/1.7 mm. The monohydrochloride of this base melts at 182° C. It is somewhat hygroscopic and readily soluble in water.

Example II 18 g. of N-phenylethyl-α-aminopyridine are allowed to react with 4.5 g. of 85% sodamide in 30 ccs. of toluene. The major portion of the toluene is distilled off, then an ethereal solution of 10 g. of dimethylaminochloroethane is added slowly over a period of one hour. The reaction mixture is stirred during that time and the ether distilled off. The mixture is refluxed for half-an-hour longer, then treated with 10% hydrochloric acid. The base is liberated with soda, extracted by means of benzene and distilled. 5.5 g. of N-dimethylamino-ethyl-N-phenylethyl-α-aminopyridine are thereby obtained. The product distils at 195–200°/4 mm. and forms a monohydrochloride, M. P. approximately 143° C.

The N-phenylethyl-α-aminopyridine is itself prepared in the following manner:

18.8 g. of α-aminopyridine are treated in 100 ccs. of toluene with 9.5 g. of 85% sodamide. 37 g. of phenylethyl bromide are added at 60° C. and the reaction mixture boiled under reflux for an hour. The base is extracted with 10% hydrochloric acid. It is then regenerated from its salt with soda, extracted with ether and distilled. There is obtained 10 g. of N-phenylethyl-α-aminopyridine of B. P. 170–175°/4 mm. solidifying at approximately 51° C.

Example III 18.4 g. of N-benzyl-α-aminopyridine are allowed to react with 5 g. of sodamide (85%) in 30 ccs. of toluene at 80° C. About a quarter of the toluene is distilled off, then over a period of an hour 12 g. of 1-dimethylamino-3-chloro-propane dissolved in 50 ccs. of ether are added gradually. The ether is distilled off, the mixture is boiled under reflux for half-an-hour and then treated with 60 ccs. of 10% hydrochloric acid, followed by 50 ccs. of benzene. The hydrochloric acid solution when adjusted to pH 7 precipitates 3.3 g. of N-benzyl-α-aminopyridine. The neutral solution is made alkaline and then extracted with benzene. By distillation there are obtained 10 g. of N-dimethylaminopropyl-N-benzyl-α-aminopyridine. It boils at 200–205°/3 mm. and forms a hydrochloride which is readily soluble in water.

Example IV 51 g. of N-p-isopropylbenzyl-α-aminopyridine are heated to 80° C. in 50 ccs. of dry toluene. 9.5 g. of sodamide are added gradually. After evolution of ammonia, the major portion of the toluene is distilled off. Into the pasty mass remaining, 120 ccs. of an ethereal solution of 20 g. of dimethylaminochloroethane are poured, the ether is distilled off and the whole is heated to 140° C. being maintained at that temperature for half-an-hour under reduced pressure (150 mm. Hg.).

The residual mass is taken up in dilute hydrochloric acid and ether decanted, neutralised to pH 7 and the α-p-isopropyl-benzylaminopyridine which has not entered into reaction separates.

After making alkaline with an excess of potash the base is extracted, dried and distilled. N-dimethylaminoethyl - N - p - isopropyl - benzyl-α-aminopyridine thereby obtained boils at 190–195°/1.9 mm.

The p-isopropyl-benzylaminopyridine melts at 104–105° C. and can be prepared by allowing p-isopropylbenzylchloride to react with α-aminopyridine converted by means of sodamide into its sodio derivative.

Example V 43 g. of α-p-methoxybenzylaminopyridine are heated in 60 ccs. of toluene to 95–100° C. 18 g. of sodamide (85%) and 110 ccs. of a 40% toluene solution of 1-dimethylamino-2-chloroethane are added in small amounts alternately with shaking; the addition takes an hour. Toluene is distilled off, first at normal pressure, then under reduced pressure, until there remains a pasty mass. This mass is worked up as in Example I. The N-dimethylaminoethyl-N-p-methoxybenzyl-α-aminopyridine boils at 185–190°/2 mm. The monohydrochloride melts at 135° C. (bloc Maquenne).

Example VI

By proceeding as in Example V but using 1-dimethylamino-3-chloropropane in place of the dimethylaminochloroethane, there is formed N-dimethylaminopropyl - N - p-methoxybenzyl-α-aminopyridine, which boils at 195–200°/2.5 mm.

Example VII

By operating in the manner described in Example V, using 2-benzylamino-pyrimidine instead of α-(p-methoxybenzylamino)-pyridine, there is obtained 2 - (N - dimethylaminoethyl-N-benzyl) - amino-pyrimidine, the hydrochloride of which melts at about 197–198° C.

The 2-benzylamino-pyrimidine can be obtained in the following manner: To 33 g. of 2-aminopyrimidine in 75 ccs. of xylene there is added 17.5 g. of sodamide of 85% strength. With the reaction mixture at a temperature of 130° C., there is added over a period of one hour 44 g. of benzyl chloride, whereupon the reaction mixture is heated for one hour up to 140° C. After cooling, 500 ccs. of 5% hydrochloric acid is added and the xylene is decanted. The aqueous layer is then brought to pH 7 by means of caustic soda (36° Bé.) and the precipitated 2-benzylaminopyrimidine is separated and recrystallised from 50% ethyl alcohol when it melts at 78–79° C. (bloc Maquenne).

Example VIII

Following the method of Example V but using 2 - benzylamino - 4:6 - dimethyl - pyrimidine in place of α - (p - methoxybenzylamino) - pyridine, there is obtained 2-(N-dimethylaminoethyl-N-benzylamino)-4:6-dimethyl-pyrimidine, the hydrochloride of which melts at 165° C.

The 2 - benzylamino - 4:6 - dimethyl - pyrimidine can be obtained by heating for two hours on the water bath 40 g. of benzyl guanidine bicarbonate with 18.3 g. of acetyl acetone. The product is dissolved in hydrochloric acid and the required base re-precipitated by addition of caustic soda. 2 - benzylamino - 4:6 - dimethyl - pyrimidine melts at 110° C. (bloc Maquenne). The benzyl guanidine bicarbonate employed is obtained in the following manner: 42.8 g. of benzylamine is reacted with 55.6 g. of the sulphate of S-methyl-isothiourea in 100 ccs. of water for a period of two and a half hours under reflux. Benzyl guanidine sulphate precipitates on cooling, it having a melting point of 207° C. The sulphate is converted into the bicarbonate by treating with an excess of baryte solution, filtering off the resulting barium sulphate and saturating the filtrate with carbon dioxide, whereupon the benzyl guanidine bicarbonate precipitates. It melts at 168° C. (bloc Maquenne).

Example IX 16.5 g. of N - dimethylaminoethyl - α - amino - pyridine are allowed to react in 40 ccs. of xylene with 4.5 g. of 85% sodamide, then over one quarter of an hour there are added at 115° C. 12.7 g. of benzyl chloride. The whole is then heated for an hour at 140° C. It is then treated with 5% potash and with benzene, decanted and rectified. N - dimethylamino - ethyl - N - benzyl - α - aminopyridine is thereby obtained, boiling at 185–190°/1.7 mm. Its monohydrochloride melts at 182° C.; it is somewhat hygroscopic and easily soluble in water.

The N - dimethylaminoethyl - α - aminopyridine starting material can be obtained in the following way: 94 g. of α-aminopyridine are allowed to react with 46 g. of 85% sodamide in 200 ccs. of dioxane, after which there is added at 100–120° C., over a period of one hour, 460 ccs. of a 25% ethereal solution of 1-dimethylamino-2-chloroethane, the ether distilling off in like proportion. The residue is treated with 5% potash and with benzene and decanted; the benzene extract is treated with 10% hydrochloric acid, the base is liberated from its hydrochloride by potash and extracted into benzene. On distilling, N - dimethylamino - ethyl - α - amino - pyridine is obtained; it boils at 150–155°/2 mm.

Example X

Replacing the benzyl chloride of Example IX by p-methoxybenzylchloride there is obtained N - dimethyl - aminoethyl - N - (p - methoxy) - benzyl - α - aminopyridine, already described in Example V.

Example XI

By replacing the benzyl chloride of Example IX with furfuryl bromide there is formed N-dimethylaminoethyl - N - furfuryl - α - amino - pyridine, which boils at 170–175°/1.8 mm.

Example XII

On replacing the benzyl chloride of Example IX by 2 - methyl - 4 - chloromethyl - thiazole, there is formed N - dimethylaminoethyl - N - (methyl - 2 - thiazolylmethyl - 4) - α - amino - pyridine, boiling at 185–190°/2mm.

Example XIII

A mixture of 17.8 g. of N-dimethylaminoethyl-benzylamine and 15.8 g. of α - bromopyridine is heated at 170° C. for one and a half hours in the presence of 0.5 g. of copper powder. The mixture is then treated with 10% soda and extracted into benzene. The benzene solution in turn is extracted with hydrochloric acid (10%). From the aqueous solution of the hydrochloride the free bases are liberated by potash and extracted into benzene. By fractional distillation, there is formed in good yield N-dimethylaminoethyl - N - benzyl - α - aminopyridine already described in Example IX.

The N-dimethylaminoethyl-benzylamine can be obtained in the following manner: 72 g. of 1 - dimethyl - amino - 2 - chloroethane - hydro - chloride are added gradually with stirring to 214 g. of benzylamine and heated to 140° C. After this addition, heating is continued for 5 minutes, then at 100° C. distilled water is added, then soda. The whole is extracted with benzene and the extract distilled. N-dimethyl-amino-ethyl-benzylamine which is thereby obtained boils at 128-132°/18 mm.

I claim:

1. New tertiary diamines being compounds of the general formula:

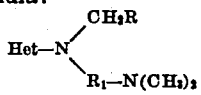

where "Het" represents a monocyclic, heterocyclic nucleus, R represents a radical selected from the class consisting of aralkyl, aryl and monocyclic heterocyclic groups and aryl substituted in the nucleus by a member of the class consisting of alkyl and alkoxy groups, and $R_1$ is a lower alkylene group having at least two carbon atoms.

2. A member of the class consisting of N-dimethylaminoethyl - N - p - methoxybenzyl - α-aminopyridine and its hydrochloride.

3. A member of the class consisting of 2-(N-dimethlylaminoethyl - N - benzyl)amino-pyrimidine and its hydrochloride.

4. A member of the class consisting of N-dimethylamino-ethyl - N - benzyl-α-aminopyridine and its hydrochloride.

5. New tertiary diamines being compounds of the general formula:

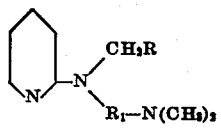

where R represents a radical selected from the class consisting of aralkyl, aryl and monocyclic heterocyclic groups and aryl substituted in the nucleus by a member of the class consisting of alkyl and alkoxy groups, $R_1$ is a lower alkylene group having at least two carbon atoms.

6. Diamines as recited in claim 5, in the form of their hydrochlorides.

7. New tertiary diamines being compounds of the general formula:

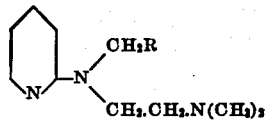

where R represents a radical selected from the class consisting of aralkyl, aryl and monocyclic heterocyclic groups and aryl substituted in the nucleus by a member of the class consisting of alkyl and alkoxy groups.

8. New tertiary diamines being compounds of the general formula:

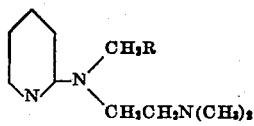

where R represents an aryl group substituted in the nucleus by an alkoxy group.

9. New tertiary diamines being compounds of the general formula:

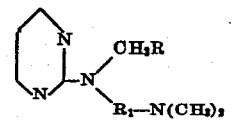

where R represents a radical selected from the class consisting of aralkyl, aryl and monocyclic heterocyclic groups and aryl substituted in the nucleus by a member of the class consisting of alkyl and alkoxy groups, $R_1$ is a lower alkylene group having at least two carbon toms.

10. New tertiary diamines being compounds of the general formula:

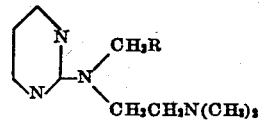

where R represents a radical selected from the class consisting of aralkyl, aryl and monocyclic heterocyclic groups and aryl substituted in the nucleus by a member of the class consisting of alkyl and alkoxy groups.

11. New tertiary diamines being compounds of the general formula:

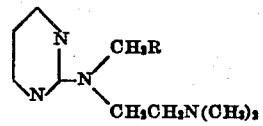

where R represents an unsubstituted aryl group.

12. An anti-histaminically active tertiary amine of the formula

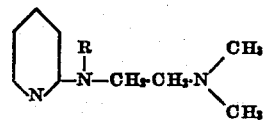

wherein R stands for aralkyl, and its salts.

13. The anti-histaminically active tertiary amine of the formula

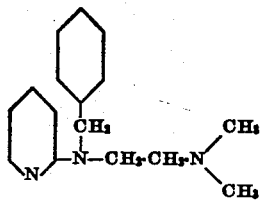

and its salts.

RAYMOND JACQUES HORCLOIS.

REFERENCES CITED

The following references are of record in the file of this patent:

UNITED STATES PATENTS

| Number | Name | Date |
| --- | --- | --- |
| 2,406,594 | Djerassi et al. | Aug. 27, 1946 |

OTHER REFERENCES

Survey of Antimalarial Drugs (1941-1945), vol. II, part 2, pages 1013-1014.